US006662639B1

(12) United States Patent
Wittliff, III et al.

(10) Patent No.: US 6,662,639 B1
(45) Date of Patent: Dec. 16, 2003

(54) SECONDARY IGNITION PICKUP AND METHOD

(75) Inventors: William Wittliff, III, Gobles, MI (US); John M. Chapin, Schoolcraft, MI (US); Robert L. Guiter, Kalamazoo, MI (US); Dale Boysen, Plainwell, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/235,799

(22) Filed: Sep. 6, 2002

(51) Int. Cl.[7] ........................ G01M 19/00; H01H 31/02
(52) U.S. Cl. ...................................... 73/118.1; 324/537
(58) Field of Search ................................ 73/118.1, 159; 324/378–391, 537, 643; 340/870.02; 322/28

(56) References Cited

U.S. PATENT DOCUMENTS

| | | | | | |
|---|---|---|---|---|---|
| 3,659,188 | A | * | 4/1972 | Alexander et al. | 322/28 |
| 4,186,337 | A | * | 1/1980 | Volk et al. | 324/380 |
| 5,170,125 | A | * | 12/1992 | Bates, Jr. | 324/537 |
| 5,196,798 | A | * | 3/1993 | Baeza et al. | 324/388 |
| 5,495,238 | A | * | 2/1996 | Baker et al. | 340/870.02 |
| 5,623,209 | A | * | 4/1997 | Lepley et al. | 324/382 |

* cited by examiner

*Primary Examiner*—Edward Lefkowitz
*Assistant Examiner*—Octavia Davis
(74) *Attorney, Agent, or Firm*—Baker & Hostetler LLP

(57) ABSTRACT

A method and apparatus for receiving and relaying signals from an ignition coil. A secondary pickup is constructed and arranged to mate with the ignition coil and to receive the secondary voltage signals. The signals can be received and relayed to an analyzer for engine evaluation through a spade that is part of the secondary pickup.

21 Claims, 4 Drawing Sheets

SECONDARY IGNITION PICKUP AND METHOD

FIELD OF THE INVENTION

The present invention generally relates to an apparatus and method for analysis of engines. More particularly, the present invention relates to an apparatus and method to pickup secondary ignition voltage.

BACKGROUND OF THE INVENTION

Conventional combustion, reciprocating engines are widely used as automotive engines. A conventional engine (e.g., single-cycle, two-cycle and others) is typically composed of an engine or cylinder block assembly having one or more cylinders therein. A piston is slidably disposed in the cylinder and moves reciprocally within the cylinder. A cylinder head at one end of the cylinder completes the cylinder assembly. The cylinder head typically contains the valves (intake and exhaust) and the spark plug. The spark plug typically ignites a pre-mixed fuel that is injected by the intake valve into a combustion chamber and helps to define an ignition event.

Should an ignition event not occur or the cylinder misfires, it can reduce the power output of the engine, can cause low fuel economy and poor performance. Engine analyzers are used to analyze the performance of internal combustion engines by analyzing ignition events of their cylinders.

A conventional digital analyzer can convert analog signals to digital signals for display on an oscilloscope, which displays snapshots of discrete portions of the signals as waveforms. In the case of multiple cylinders, waveforms showing the primary and the secondary ignition voltages are displayed. The voltages are acquired from a primary lead and a secondary lead (referred to as pickups) that are connected to an ignition coil at one end. The primary and secondary leads are connected at the other end to the analyzer, which runs tests and obtains data that is converted and displayed as waveforms. The secondary leads can be a capacitive pickup and the high voltage signals are capacitively sensed and converted to waveforms by the analyzer.

In newer engines, there can be one ignition coil per cylinder, referred to as "coil-on-plug", where each coil is typically mounted on top of the spark plug. The primary voltage is measured with a direct connection via a primary lead connected to the ignition coil. Conventionally, the secondary lead clamps on a spark plug wire, however, this is not possible on newer engines with "coil-on-plug" because the coil covers the plug. Additionally, conventional secondary capacitive pickups also have circuitry built thereon to boost the secondary voltage signals. The circuits, if not working properly, can relay faulty voltage readings to the analyzer. The circuits also add additionally costs and production time to the secondary capacitive pickups. Without information regarding secondary voltage from the secondary leads, any calibration or analysis of the engine will be incorrect and incomplete. Thus it is important to obtain secondary voltage in order to proper analyze the engine and the ignition events of each cylinder.

Therefore, there is a need for a low cost apparatus and method to obtain secondary voltage in engines so that the analyzer can analyze and display accurate data, particularly one that can be used with coil-on-plug arrangements, if desired.

SUMMARY OF THE INVENTION

Embodiments of the present invention generally provide for an apparatus and method to allow the analyzer to collect secondary voltage of an ignition event. In one embodiment, a pickup apparatus for use with a lead of an analyzer that analyzes an engine having an ignition coil, the apparatus can include a first body member capable of receiving voltage signals from the ignition coil, a first attachment portion that can extend from the first body member and can attach the first body member to the ignition coil, and a first spade integral with the pickup apparatus that can extend from one of the first body member and the first attachment portion and can be connectable to the lead, wherein the first body member, the first attachment portion, and the first spade can be in communication with each other and can relay voltage signals from the ignition coil to the lead. The first body member, the first attachment portion, and the first spade can be a unitary structure and can be made from a conductive material. The conductive material may be selected from 304 stainless steel, copper, aluminum, brass, ferrous metal, and a combination thereof. The pickup apparatus can further include a second body member capable of receiving voltage signals from the ignition coil, a second attachment portion that can extend from the second body member and can attach the second body member to the ignition coil, a second spade integral with the pickup apparatus that can extend from one of the second body member and the second attachment portion and can be connectable to the lead, and a connector connecting the first and second body members, wherein the first and second body members, the first and second attachment portions, the first and second spades can be in communication with each other and can relay voltage signals from the ignition coil to the lead. The second body member and the second attachment portion can have a shape complimentary to the ignition coil to fit on the ignition coil. The first and second body members, the first and second attachment portions, and the first and second spades can be made from a conductive material. The conductive material can be 304 stainless steel, copper, aluminum, brass, ferrous metal and a combination thereof. Additionally, the first body member and the first attachment portion can have a shape complimentary to the ignition coil to fit on the ignition coil. The first and second spades can be of same thickness as the rest of the pickup apparatus and can be continuous throughout.

In another embodiment, a method of conveying signals from an ignition coil to an engine analyzer that can include attaching a secondary pickup to the ignition coil to receive signals from the ignition coil, receiving the signals from the ignition coil with the secondary pickup, and relaying the received signals to the engine analyzer. The signals may be secondary voltage signals, and the receiving step may include capacitively receiving the secondary voltage signals with the secondary pickup. The step of relaying the signals can further include the step of connecting a lead to the pickup.

In an alternative embodiment, a pickup apparatus for use with a lead of an analyzer that analyzes an engine having an ignition coil can include a first means for receiving voltage signals from the ignition coil, a first means for attaching that can extend from the means for receiving and can attach the means for receiving to the ignition coil, and a first means for connecting that can extend from one of the first means for receiving and the first means for attaching and can be connectable to the lead, wherein the first means for receiving, the first means for attaching, and the first means for connecting are in communication with each other and can relay voltage signals from the ignition coil to the lead. The first means for receiving, the first means for attaching, and the first means for connecting can be a unitary structure and can be made from a conductive material. The conductive material can be selected from 304 stainless steel, copper, aluminum, brass, ferrous metal, and a combination thereof. The pickup apparatus can further include a second means for receiving voltage signals from the ignition coil, a second means for attaching that can extend from the second means for receiving and can attach the second means for receiving to the ignition coil, a second means for connecting that can extend from one of the second means for receiving and the second means for attaching and can be connectable to the lead, and a coupling means for coupling the first and second means for receiving together, wherein the first and second means for receiving, the first and second means for attaching, and the first and second means for connecting can be in communication with each other and can relay voltage signals from the ignition coil to the lead. The second means for receiving, the second means for attaching, and the second means for connecting can be made from a conductive material that can be selected from 304 stainless steel, copper, aluminum, brass, ferrous metal, and a combination thereof.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

The embodiments of the present invention provide a secondary pickup and method to measure secondary ignition patterns or secondary voltage during an ignition event. The secondary pickup can be used with an analyzer, such as an engine analyzer, and can be used with engines of varying number of cylinders (1, 2, 4, etc.).

Figure 1:
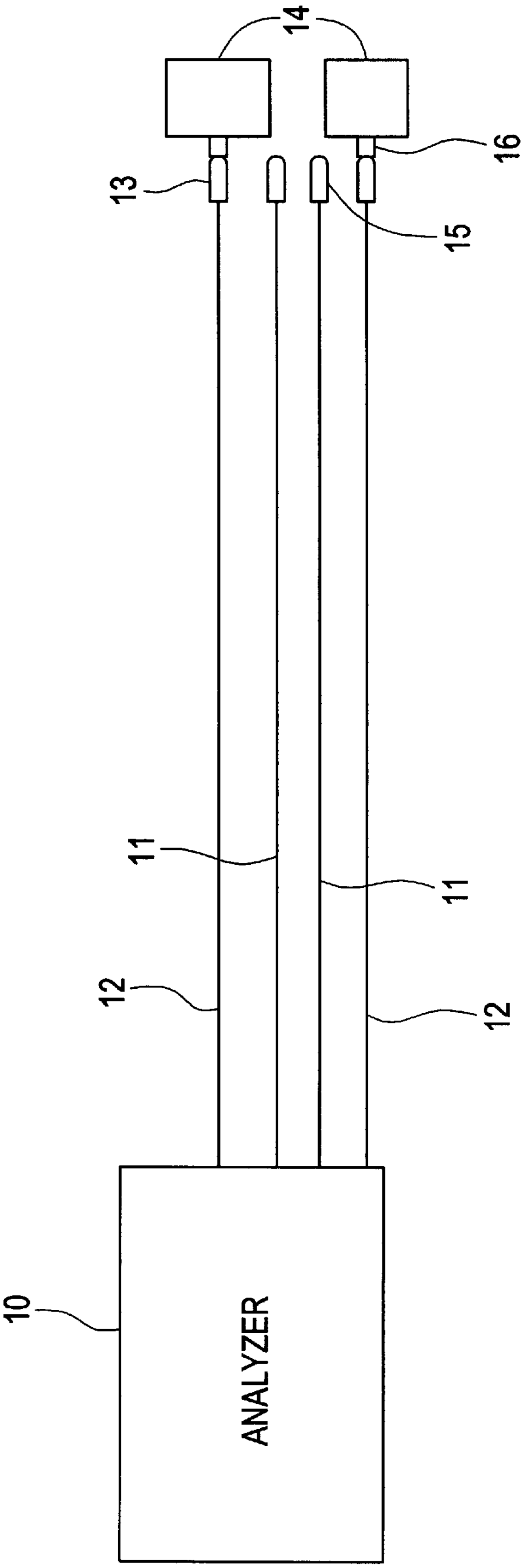
FIG. 1 illustrates an analyzer with pickups according to an embodiment of the present invention.

FIG. 1 illustrates an analyzer 10 with pickups according to an embodiment of the present invention. An analyzer 10 having a first lead wire 11 connected to a primary pickup 15 and a second lead wire 12 connected to a secondary pickup 14. The analyzer 10 can be any analyzer that receives a signal relayed by the primary pickup 15 and the secondary pickup 14, such as an engine analyzer (VISION PREMIER™, PERCEPTION™, available from OTC, Owatonna, Minn.), a Digital Voltage Ohm Meter, a scope, a hand held meter, or other analyzers. The analyzer 10 has a microprocessor that runs the analyzer, a waveform data acquisition system that acquires waveforms, a DMA controller that controls the writing of the waveform to the memory, a memory and a user interface.

The analyzer 10 can display the primary and secondary signals on a scope in waveforms or any other format, so that the user can interpret the signals relayed by the primary 15 and secondary pickups 14. The signals can be from the primary and secondary ignition voltage generated by an ignition coil. The ignition coil converts the low voltage (provided by a battery) to a high voltage that is routed by a distributor to the spark plug for ignition.

The analyzer 10 can be connected to various lead wires, such as the primary 11 and the secondary lead wires 12. At a first end, the primary lead wire 11 can be connected to the analyzer 10 and at the second end to the primary pickups 15. Since newer engines have a coil-on-plug, the primary pickup can be connected directly to the ignition coil, but a conventional secondary pickup can not be used due to the placement of the ignition coil over the spark plug.

At a first end, the secondary lead wire 12 can be connected to the analyzer 10 and at a second end to the secondary pickup 14. The second end of the secondary lead wire 12 has a spade receiver 13, which can mate with a spade 16 of the secondary pickup 14. The secondary voltage signals generated from the ignition coil can be picked up by the secondary pickup 14, travel to the spade 16 and the space receiver 13 and along the secondary lead wire 12 to the analyzer 10. The analyzer 10 can process the secondary voltage signals and display them to the user for analysis.

The secondary pickup 14 can be made from a stamped piece of a material, such as a metal or an alloy, and can include 304 stainless steel, copper, aluminum, brass, ferrous metal, or any other conductive material. The secondary pickup 14 can be made of a material that is preferably malleable, so that its shape can be constructed and arranged to fit in a complementary fashion around a particular ignition coil.

In a preferred embodiment, the secondary pickup 14 can be custom fitted to a specific ignition coil for a particular engine so that the size and shape will provide optimal signal conduction. Ignition coils are made by various manufacturers for various car-producing companies and thus, vary in size and shape. Because the secondary pickup 14 can be custom fitted to fit a particular ignition coil, a better contact can be made leading to better conduction of the signal and better analysis of the engine cylinder. Additionally, in some embodiments, the more surface area the secondary pickup 14 has, the better the conduction of the signals.

In another embodiment, the secondary pickup 14 is also removable so that it can be removed after the engine analysis is completed. Further, the secondary pickup 14 does not contain circuits thereon, so signal errors that can result from faulty circuitry on conventional secondary pickups are avoided. Because no expensive circuitry is required on the secondary pickup 14, the pickup is cheaper to produce and the production time can be less then conventional secondary pickups.

Figure 2A:
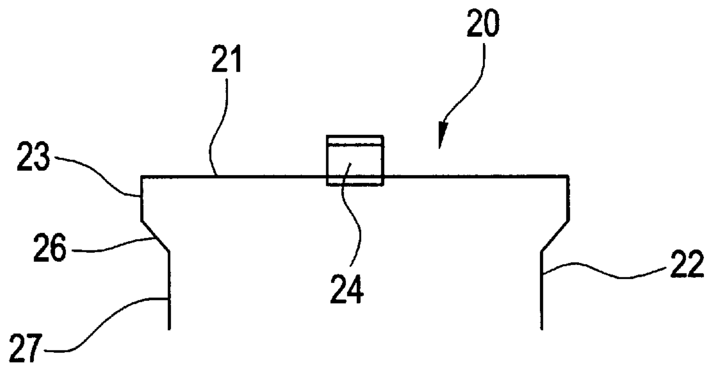
FIGS. 2A, 2B and 2C illustrate one embodiment of a secondary pickup.
Figure 2B:
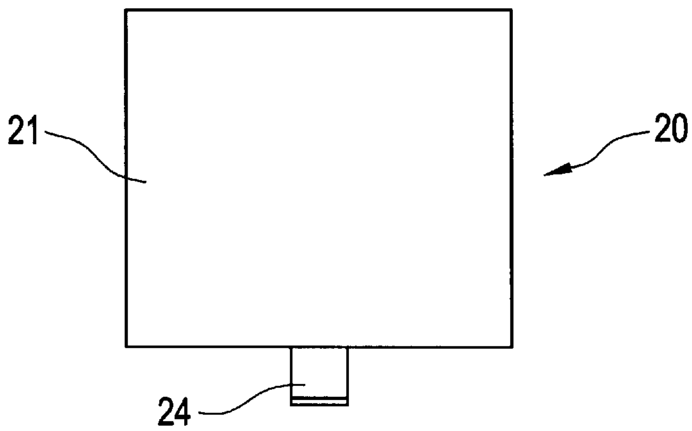
Figure 2C:
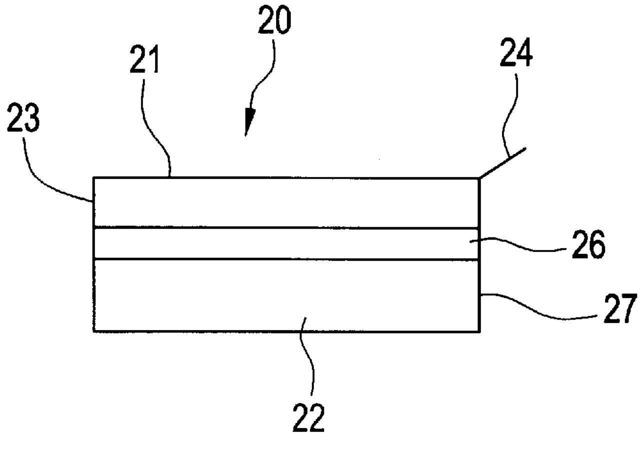
Figure 3A:
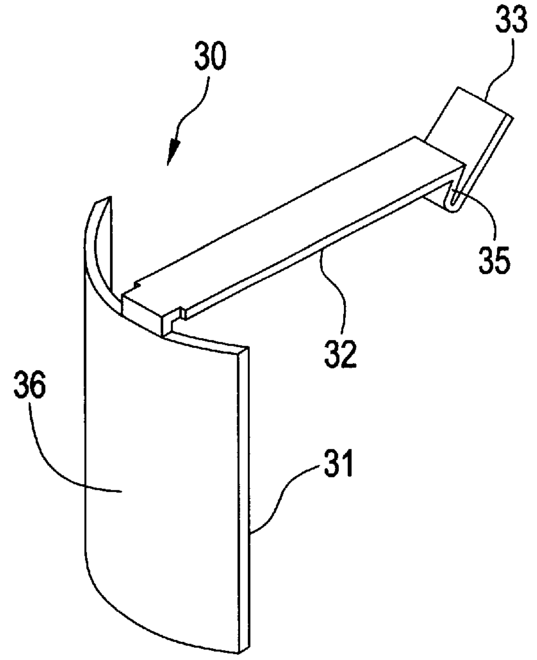
FIGS. 3A, 3B, 3C, and 3D illustrate another alternative embodiment of the secondary pickup.
Figure 3B:
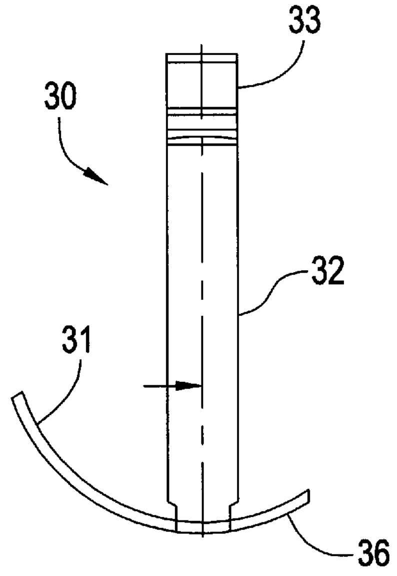
Figure 3C:
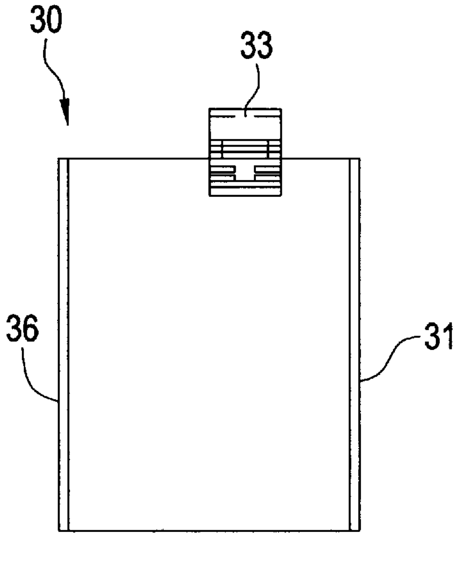
Figure 3D:
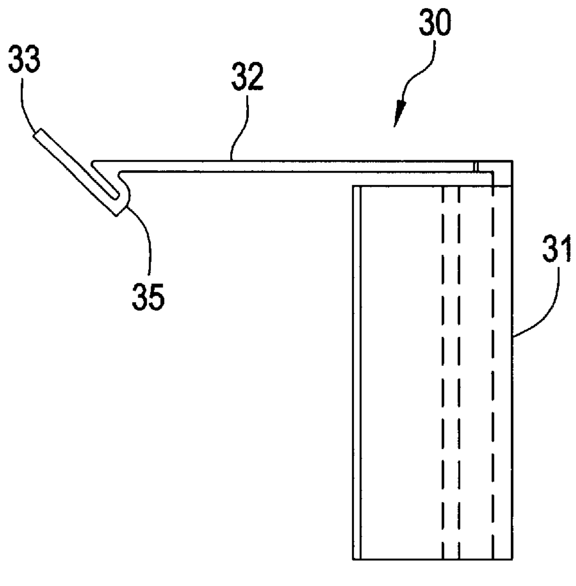

FIGS. 2A, 2B and 2C illustrate one embodiment of a secondary pickup 20. FIG. 2A is a front view illustrating the secondary pickup 20, which can include a body 21 having at least one first member 22, preferably at least two first members 22, and a spade 24. The body 21 can be any shape that fits the desired ignition coil, and preferably square or rectangular in shape and having four edges. The body 21 can fit over the top portion of the ignition coil.

The secondary members 22 extend from the body 21 along two of its four edges and can be constructed and arranged to couple with the ignition coil. The first members 22 provide additional contact areas for increased secondary voltage signal pickup and to assist in securing the secondary pickup 20 to the ignition coil. The first member 22 has a first portion 23, a second portion 26, and a third portion 27. The second portion 26 is angled or truncated in relation to the first portion 23 to provide a better connection with the ignition coil.

The spade 24 connects to the spade receiver 13 of the secondary lead wire 12 to relay the secondary signals received from the ignition coil to the analyzer 10. In one embodiment, the spade 24 can be angled from a plane of the body 21 for easier connection with the spade receiver 13. The spade 24 can have at least a portion being hollow to receive a clip, such as an alligator type clip, preferably, the spade is solid throughout. By being solid throughout, the secondary signals are better transmitted to the spade receiver 13 through a wider continuous surface area than with a portion being hollow. Additionally, the spade 24 can have the same thickness as the rest of the secondary pickup 20 for faster production and less cost of raw materials.

In another embodiment, the spade 24 is an integral part of the secondary pickup 20 or is manufactured in one piece with the pickup, and is not required to be attached to the pickup in a separate production step. Conventional secondary pickups use connections, such as banana jacks or RCA type jacks, to connect to the secondary lead wire 12. The banana and RCA jacks have to be soldered or welded to the pickup in a separate manufacturing process. Because the spade 24 is an integral part of the pickup 20, the manufacturing cost and time are less then conventional pickups. Additionally, the signal is better transmitted than conventional pickups, where the signal can degrade when travelling through welded or soldered portion of the conventional pickups. Additional views of the secondary pickup 20 are also provided in the top view of FIG. 2B and the side view of FIG. 2C.

FIGS. 3A, 3B, 3C, and 3D illustrate another alternative embodiment of the secondary pickup 30. In the perspective view FIG. 3A, the secondary pickup 30 includes a body 31, a first member 32 and a spade 33. The body 31 can be constructed and arranged to fit the desired ignition coil, preferably, the body is curved similarly to a complementary portion of the ignition coil. Additionally, the body 31 has a large surface contract area 36, which contacts a significant portion of the ignition coil and helps to better conduct the secondary signals that are produced.

Extending from the body 31 is the first member 32, which along with the spade 33 helps to secure the secondary pickup 30 to the ignition coil. The spade 33 can extend from the first member 32 or can extend from the body 31. The first member 32 can pickup secondary voltage signals from the ignition coil.

The spade 33 is angled in relation to the body 31 to provide a better connection with the spade receiver 13 of the secondary lead wire 12 that relays the secondary voltage signals received from the ignition coil to the analyzer 10. Additionally, the spade 33 includes a coupling portion 35 that helps to secure the secondary pickup 30 to the ignition coil. The spade 33 can have at least a portion being hollow to receive a clip, such as an alligator type clip, preferably, the spade is solid throughout. By being solid throughout, the secondary signals are better transmitted to the spade receiver 13 through a wider continuous surface area than with a portion being hollow. Additionally, the spade 33 can have the same thickness as the rest of the secondary pickup 30 for faster production and less cost of raw materials.

In another embodiment, the spade 33 is an integral part of the secondary pickup 30 or is manufactured in one piece with the pickup, and is not required to be attached to the pickup in a separate production step. Conventional secondary pickups use connections, such as banana jacks or RCA type jacks, to connect to the secondary lead wire 12. The banana and RCA jacks have to be soldered or welded to the pickup 30 in a separate manufacturing process. Because the spade 33 is integral with the pickup 30, the manufacturing cost and time are less then conventional pickups. Additionally, the signal is better transmitted than conventional pickups, where the signal can degrade when travelling through welded or soldered portion of the conventional pickups. Additional views of this alternative embodiment of secondary pickup 30 are also provided in the top view of FIG. 3B, the front view of FIG. 3C, and the side view of FIG. 3D.

Figure 4C:
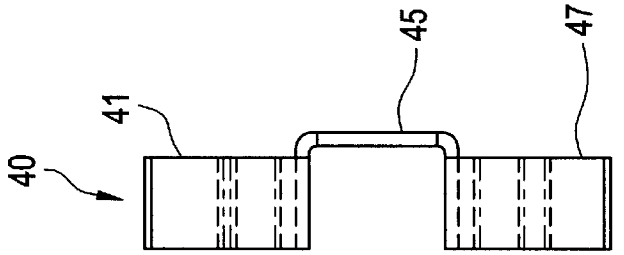
FIGS. 4A, 4B and 4C illustrate still another alternative embodiment of the secondary pickup.
Figure 4A:
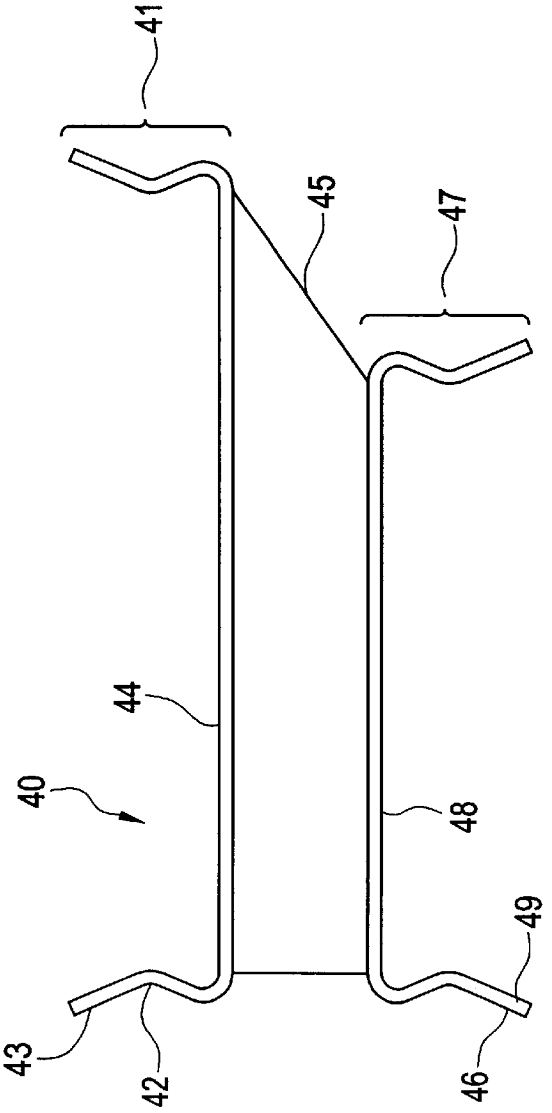
Figure 4B:
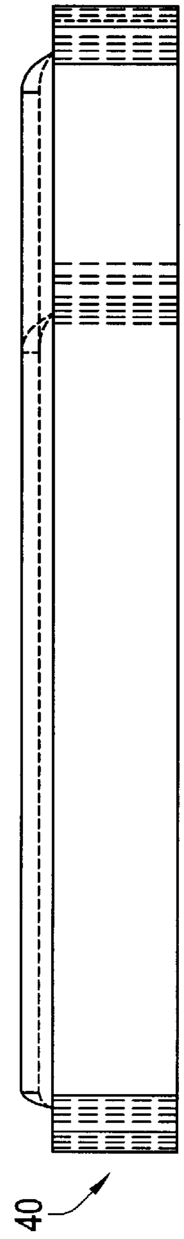

FIGS. 4A, 4B and 4C illustrate still another alternative embodiment of the secondary pickup 40. In one embodiment shown in FIG. 4A from the side, the secondary pickup 40 has a first portion 41 and a second portion 47 that are coupled together via a connecting member 45. The first portion 41 has a first body 44 that can be constructed and arranged to fit over the desired ignition coil. At an end of the first body 44, at least one first member 42 is present, preferably there are two first members 42 at each end of the first body. The first members 42 are constructed and arranged to help secure the secondary pickup 40 to the ignition coil. The connecting member 45 couples the first and second portions 41, 47 together.

The second portion 47 has a second body 48 that can be constructed and arranged to fit over the desired ignition coil. The second portion 47 can be a different size than the first portion 41. At an end of the second body 48 at least one secondary member 49 is present, preferably there are two secondary members 49 at each end of the second body. The secondary member 49 is constructed and arranged to help secure the secondary pickup 40 to the ignition coil. The secondary members 42, 49 of the first portion 41 and the second portion 47 can also contain a spade portion 43, 46, respectively. In an alternative embodiment, the spade portions 43, 46 are extends from the first and second bodies 44, 48.

The spade portions 43, 46 are connected to the spade receiver 13 of the secondary lead wire 12 that relays the secondary voltage signals received from the ignition coil to the analyzer 10. The spades 43, 46 can have at least a portion being hollow to receive a clip, such as an alligator type clip, preferably, the spade is solid throughout. By being solid throughout, the secondary signals are better transmitted to the spade receiver 13 through a wider continuous surface area than with a portion being hollow. Additionally, the spades 43, 46 can have the same thickness as the rest of the secondary pickup 40 for faster production and less cost of raw materials In an other embodiment, the spade portions 43, 46 are an integral part of the secondary pickup 30 or are manufactured in one piece with the pickup, and are not required to be attached to the pickup in a separate production step. Conventional secondary pickups use connections, such as banana jacks or RCA type jacks, to connect to the secondary lead wire 12. The banana and RCA jacks have to be soldered or welded to the pickup 40 in a separate manufacturing process. Because the spades 43, 46 are an integral part of the pickup 30, the manufacturing cost and time are less then conventional pickups. Additionally, the signal is better transmitted than conventional pickups, where the signal can degrade when travelling through welded or soldered portion of the conventional pickups.

The first portion 41 and the second portion 47 are designed to fit on two different ignition coils sizes. Although it is desirous that the same model car has the same ignition coil size, it is possible that the same model may have different size ignition coils on the same engine. Additionally, the same model car may not have the same ignition coil as the previously tested model although they are the same model car. By having two different sizes of secondary pickups available, it will save the user time from searching for the correct sized secondary pickup for that model's ignition coil. Additional views of this alternative embodiment of secondary pickup 40 are also provided in the view of FIG. 3B, and the side of FIG. 4C.

In an alternative embodiment, the first and second portions 41, 47 are not connected together and are separated into individual portions. By being separated, the weight of the secondary pickup 40 is decreased, thereby saving shipping costs to the user.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A pickup apparatus for use with a lead of an analyzer that analyzes an engine having an ignition coil, the apparatus comprising:

a first body member capable of receiving voltage signals from the ignition coil;

a first attachment portion that extends from the first body member and attaches the first body member to the ignition coil; and a first spade integral with the pickup apparatus that extends from one of the first body member and the first attachment portion and is connectable to the lead, wherein the first body member, the first attachment portion, and the first spade are in communication with each other and can relay voltage signals from the ignition coil to the lead.

2. The pickup apparatus of claim 1, wherein the first body member, the first attachment portion, and the first spade are a unitary structure.

3. The pickup apparatus of claim 1, wherein the first body member, the first attachment portion, and the first spade are made from a conductive material.

4. The pickup apparatus of claim 3, wherein the conductive material is selected from a group consisting of 304 stainless steel, copper, aluminum, brass, ferrous metal, and a combination thereof.

5. The pickup apparatus of claim 1, further comprising:

a second body member capable of receiving voltage signals from the ignition coil;

a second attachment portion that extends from the second body member and attaches the second body member to the ignition coil;

a second spade integral with the pickup apparatus that extends from one of the second body member and the second attachment portion and is connectable to the lead; and a connector connecting the first and second body members, wherein the first and second body members, the first and second attachment portions, the first and second spades are in communication with each other and can relay voltage signals from the ignition coil to the lead.

6. The pickup apparatus of claim 5, wherein the second body member and the second attachment portion have a shape complimentary to the ignition coil to fit on the ignition coil.

7. The pickup apparatus of claim 5, wherein the first and second body members, the first and second attachment portions, and the first and second spades are made from a conductive material.

8. The pickup apparatus of claim 7, wherein the conductive material is selected from a group consisting of 304 stainless steel, copper, aluminum, brass, ferrous metal and a combination thereof.

9. The pickup apparatus of claim 1, wherein the first body member and the first attachment portion have a shape complimentary to the ignition coil to fit on the ignition coil.

10. The pickup apparatus of claim 5, wherein the first and second spades are of same thickness as the rest of the pickup apparatus.

11. The pickup apparatus of claim 5, wherein the first and second spades are continuous throughout.

12. A method of conveying signals from an ignition coil to an engine analyzer, comprising:

attaching a secondary pickup to the ignition coil to receive signals from the ignition coil;

receiving the signals from the ignition coil with the secondary pickup; and relaying the received signals to the engine analyzer.

13. The method of claim 12, wherein the signals are secondary voltage signals, and the receiving step comprises capacitively receiving the secondary voltage signals with the secondary pickup.

14. A method according to claim 12, wherein the step of relaying the signals further comprises the step of connecting a lead to the pickup.

15. A pickup apparatus for use with a lead of an analyzer that analyzes an engine having an ignition coil, the apparatus comprising:

a first means for receiving voltage signals from the ignition coil;

a first means for attaching that extends from the means for receiving and attaches the means for receiving to the ignition coil; and a first means for connecting that extends from one of the first means for receiving and the first means for attaching and is connectable to the lead, wherein the first means for receiving, the first means for attaching, and the first means for connecting are in communication with each other and can relay voltage signals from the ignition coil to the lead.

16. The pickup apparatus of claim 15, wherein the first means for receiving, the first means for attaching, and the first means for connecting are a unitary structure.

17. The pickup apparatus of claim 15, wherein the first means for receiving, the first means for attaching, and the first means for connecting are made from a conductive material.

18. The pickup apparatus of claim 17, wherein the conductive material is selected from a group consisting of 304 stainless steel, copper, aluminum, brass, ferrous metal, and a combination thereof.

19. The pickup apparatus of claim 15, further comprising:

a second means for receiving voltage signals from the ignition coil;

a second means for attaching that extends from the second means for receiving and attaches the second means for receiving to the ignition coil;

a second means for connecting that extends from one of the second means for receiving and the second means for attaching and is connectable to the lead; and a coupling means for coupling the first and second means for receiving together, wherein the first and second means for receiving, the first and second means for attaching, and the first and second means for connecting are in communication with each other and can relay voltage signals from the ignition coil to the lead.

20. The pickup apparatus of claim 19, wherein the second means for receiving, the second means for attaching, and the second means for connecting are made from a conductive material.

21. The pickup apparatus of claim 20, wherein the conductive material is selected from a group consisting of 304 stainless steel, copper, aluminum, brass, ferrous metal, and a combination thereof.

* * * * *